July 2, 1963 N. A. HURST ETAL 3,095,773
PERFORATOR FOR PNEUMATIC TIRE SIDEWALL
Filed Jan. 6, 1960 2 Sheets-Sheet 1
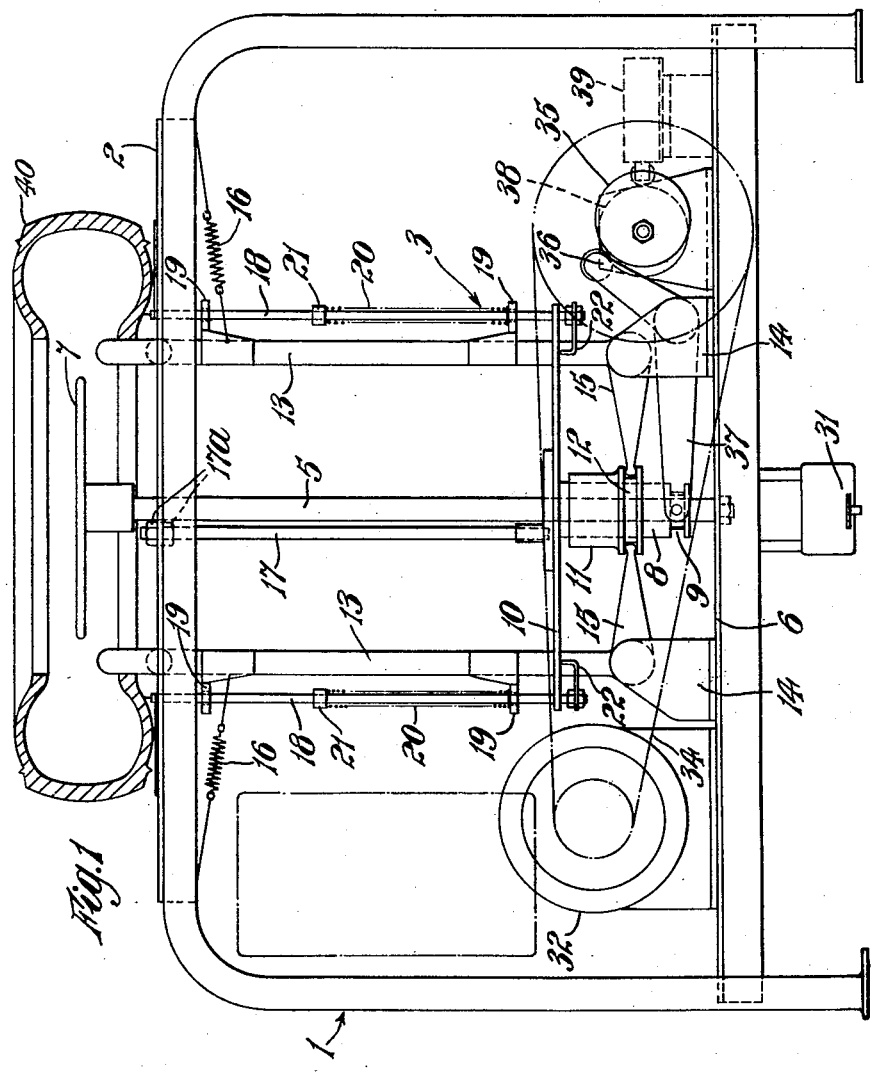
INVENTORS
Norman Ashcroft Hurst
Walter James Edney
by Benj. T. Rauber
their attorney July 2, 1963 N. A. HURST ETAL 3,095,773
PERFORATOR FOR PNEUMATIC TIRE SIDEWALL
Filed Jan. 6, 1960 2 Sheets-Sheet 2
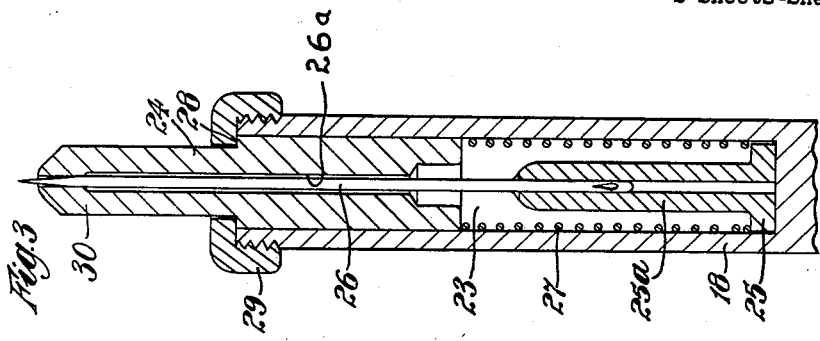
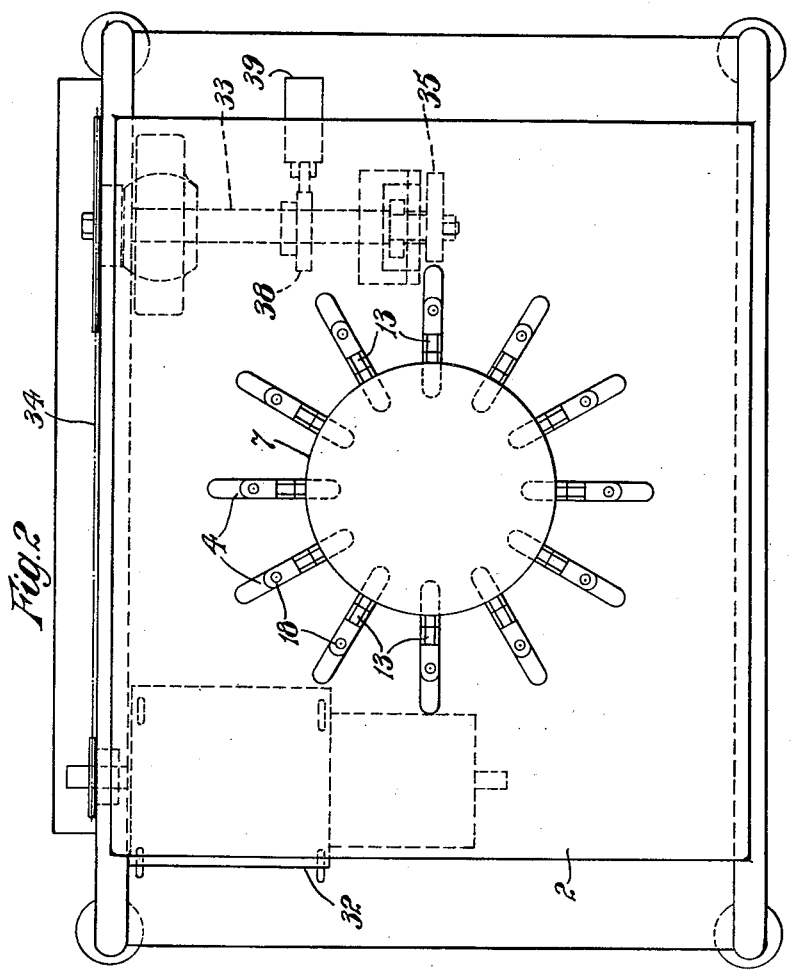
INVENTORS
Norman Ashcroft Hurst
Walter James Edney
by Benj. T. Rauber
their attorney ically 3,095,773
Patented July 2, 1963

3,095,773
PERFORATOR FOR PNEUMATIC TIRE SIDEWALL
Norman Ashcroft Hurst, Four Oaks, and Walter James Edney, Birmingham, England, assignors to Dunlop Rubber Company Limited, County of London, England, a company of Great Britain
Filed Jan. 6, 1960, Ser. No. 814
Claims priority, application Great Britain June 10, 1959
11 Claims. (Cl. 83—2)

It is known that pneumatic tires, particularly tubeless tires, may be defective as the result of the presence of air in the vicinity of the cords of the reinforcement of the tire. Percolation of air into the laminated wall of the tire is likely to take place after inflation of a tubeless tire because the inner wall of the tire is slightly porous. It is known to provide for removal of air so trapped in the tire by piercing a number of fine holes to a predetermined depth in the outer wall of the tire, such holes permitting any trapped air to leak away harmlessly.

The present invention provides a machine for producing such leakage holes in a pneumatic tire.

The machine according to the invention comprises a set of arms for centralising the tire, a set of needle holders and means for first spreading the arms into contact with the beads of the tire to centralize it and then advancing the needle holders to cause the needles to pierce a side wall of the tire to a controlled depth.

In its preferred form, the machine according to the invention includes a table for supporting the tire, the arms are arranged in a circle and extend upwardly through slots in the table, the needle holders are movable up and down in guides on the arms, the arms are urged outwardly and the needle holders are urged upwardly towards the tire by springs, and a cam mechanism is provided for initially retracting the arms and needle holders, the cam mechanism permitting the springs to move the arms and needle holders towards the tire. The machine is capable of piercing tires of varying internal diameter. As the arms move outwardly into contact with the beads of the tire, the needles are brought automatically into the correct position to pierce the side walls of the tire when subsequently lifted.

One embodiment of the invention will now be described, by way of example, with reference to the accompanying drawings in which:

FIGURE 1 is an elevation of a machine for piercing air leakage holes in a pneumatic tire, showing a tire in cross-section located on a machine table with needles positioned ready to pierce the tire.

FIGURE 2 is a plan view of FIGURE 1 with the tire omitted.

FIGURE 3 is a longitudinal cross-section through a needle holder assembly on a greatly enlarged scale.

The machine according to the invention comprises a table 1 with a table top 2 for supporting a tire to be pierced, and power-operated means 3 for piercing the tire which is disposed beneath the table top.

The power-operated means 3 includes a central guide pillar 5 extending upwardly from a horizontal base plate 6 through the table top and positioned substantially centrally with respect to the table top. A circular guide plate 7 is mounted coaxially on the upper end of the guide pillar 5, on the lower end of which is slidably and coaxially mounted an inner sleeve 8. An annular groove 9 is formed at the lower end of the inner sleeve by means of which the axial movement of the inner sleeve on the pillar 5 can be controlled as will be described. In the inoperative state of the machine, the inner sleeve is in its lowermost position on the guide pillar 5.

On the upper end of the inner sleeve is coaxially and rigidly mounted a flange in the form of a circular disc 10 having twelve slots (not shown) equally spaced around a common pitch circle, each slot extending radially outwardly from the centre of the disc. An outer sleeve 11 is mounted so as to be axially slidable over the inner sleeve 8 and is disposed between the circular disc 10 and the annular groove in the inner sleeve 8. An annular groove 12 is formed at the lower end of the outer sleeve 11 for a purpose which will be described.

Twelve equally spaced slots 4 extend radially outwardly from the central point of the table top 2, as shown in FIGURE 2. Twelve centralising arms 13, one for each slot 4 in the table top 2, are each pivotally supported on a horizontal axis on a bracket 14, the brackets being equally spaced around a common pitch circle coaxial with the guide pillar 5 and being secured to the base plate 6. Each centralising arm extends upwardly through one of the slots in the disc 10 and one slot in the table top 2 and the top end of each arm is normally located just beneath the guide plate 7. A radially inwardly projecting extension 15 is integrally formed on the lower part of each centralising arm 13 and its end is engaged in the annular groove 12 of the outer sleeve 11. Tension springs 16 are provided one for each arm. One end of each spring is connected to an arm and the other end to an anchorage beneath the table top 2, the springs serving to urge the arms radially outwardly from the guide pillar 5. The arms are, however, in the inoperative state of the machine held in a position beneath the guide plate 7 by the outer sleeve 11 held in its lowermost position by the abutting disc 10 itself held in its lowermost position by the inner sleeve 8. A vertical stop rod 17 is secured at its upper end to the table top 2 by nuts 17a and is guided by a bushing in the disc 10. The rod 17 is for contacting the upper end of the outer sleeve 11 to limit its upward movement and thus the outward spreading of the centralising arms, normally arrested by the beads of a tire, in the event of the machine being operated when no tire is placed upon it.

Each centralising arm carries a needle holder 18 slidably mounted in guides 19 attached to the side of the arm, one adjacent to and below the table top and the other adjacent to and above the disc 10. A compression spring 20, fitted coaxially around the needle holder between the lower guide 19 and an abutment ring 21 which is secured to the needle holder intermediate the associated pair of guides 19, urges the needle holder upwards. A bracket 22 is secured to the lower end of the needle holder and bears on the underside of the disc 10. Movement of the disc 10 thus allows movement of the needle holders axially upwardly in their guides 19 influenced by the springs 20. The outward spreading of the centralising arms provides means for correctly positioning the needles for piercing the sidewalls of the tire.

Each needle holder has a recess 23 at its upper end which contains a needle guide 24 and a needle base 25 formed with a pillar 25a incorporating a chuck within which the lower end of a needle 26 is secured by tightening the chuck and by soldering the needle in the chuck. The needle passes through a bore 26a in the guide 24. A compression spring 27, urges the base 25 against the bottom of the recess and urges the guide upwards against a shoulder 28 formed on a cap 29 screwed on the upper end of the holder. An upward extension 30 of the needle guide 24 shrouds the upper part of the needle to restrain it from bending and breaking when it pierces the tire. When the needle holder is raised, upward movement of guide 24 is resisted by the sidewall of the tire and the guide is accordingly caused to descend into the recess 23, against the resistance of the compression spring 27, the guide moving clear of the needle which pierces the tire.

The movement of the needle is terminated when the lower end of the guide 24 contacts the upper end of the pillar 25a and thus the depth of penetration of the needle into the tire may be predetermined by the distance between the guide and the pillar. When the hodler is moved downwards again the compression spring 27 returns the guide to its original position, so ensuring that the needle point will enter the tire properly centralised in relation to the holder and adequately supported to avoid the danger of bending and breaking.

A foot switch 31 is positioned beneath the base plate 6 the switch being connected to an electric motor and reduction gear 32 secured to the base plate. The reduction gear is drivably connected to a cam shaft 33 by an endless chain and sprocket drive 34. A cam 35 is mounted at the end of the cam shaft remote from the chain drive 34 and this cam coacts with a cam lever 36 pivoted on a horizontal axis on one of the centralising arm brackets 14. An arm 37 formed integrally with the lever 36 is engaged at its free end in the annular groove 9 of the inner sleeve 8. The cam 35 and associated lever 36 and arm 37, by rotation of the cam shaft 33, will move the inner sleeve 8 axially downwardly against the restraint of the springs 16 acting through the centralising arms 13 and extensions 15 and also of the springs 20 acting through the needle holders 18, brackets 22 and disc 10. On further rotation of the cam shaft the cam 35 will allow the inner sleeve 8 to move axially upwardly by the action of the springs 16 and 20.

In operation, a tire 40 is placed on the table top 2 of the machine with its beads surrounding the guide plate 7 as shown in FIGURE 1 the centralising arms 13, however, being in the inoperative position beneath the table top 2. The foot switch 31 is pressed and the cam shaft 33 is driven by the motor and reduction gear 32 as already described. In its initial position the cam 35 holds the end of the lever 36 in its highest position and the sleeve 8 in its lowest position, the sleeve 11 also being held in its lowest position by virtue of its abutment with the plate 10 attached to the inner sleeve 8. As the cam rotates, however, the end of the lever 36 falls on the cam surface under the action of the springs 16 as described and the tops of the centralising arms 13 move outwards away from the guide pillar 5. The tops of the centralising arms contact the beads of the tire, so centralising it and by virtue of the position of the needles 26 relative to the arms 13 the needles are located at appropriate piercing positions relative to the sidewalls of the tire. When the centralising movement has taken place the outer sleeve 11 terminates its upward movement and by further rotation of the cam 35 the inner sleeve is allowed to move further upwards by the springs 20. Upward movement of the inner sleeve causes upward movement of the plate 10 which allows upward movement of the needle holders until the needles 26 contact the tire. Further upward movement of the holders causes the needle guides 24 to be pressed clear of the needles which thus pierce the tire sidewall.

On continued movement of the cam shaft 33, the cam actuates the lever 36 which at first lowers the inner sleeve 8 and causes withdrawal of the needles from the tire the guides 24 moving back over the needles to shroud them. The disc 10, moving downwards with the inner sleeve, abuts against the outer sleeve 11 which, moving downwards with it, withdraws the centralising arms 13 from the bead region of the tire. After the cam shaft 33 has completed one revolution and the mechanism has returned to its normal position, the second cam 38 actuates the limit switch 39 to stop the motor. The tire 40 is then removed from the table.

One sidewall of a tire may thus be pierced in a great number of positions around the tire in one operation and the machine is capable of accommodating tires of a range of internal diameter, i.e. from 11 to 17 inches.

In a modification of the embodiment described above, provision can be made for automatically loading the tires onto the table, and subsequently removing them after treatment. In this case the foot switch is replaced by a motor starting switch which is operated automatically by deposition of a tire on the table.

In a second modified embodiment the needle holders may be urged upwardly by fluid pressure, air cylinders being fitted in place of the springs 20 to the lower ends of the needle holders. The air pressure inside the cylinders may be applied and released by a valve operated by a third cam mounted on the cam shaft 33.

Furthermore, in another embodiment, instead of the cam lever 36, an air cylinder may be fitted to the central pillar to restrain the sleeves 8 and 11 in their normal lower position.

Having now described our invention—what we claim is:

1. A machine for piercing the side walls of a pneumatic tire having a tire bead which comprises a support for a pneumatic tire, said support having slots radial to a center, an inner sleeve beneath said support and slidable toward and from said support on an axis normal to said support and extending through said center, said sleeve having an outwardly extending flange, means for guiding said sleeve in its movement toward and from said support, an outer sleeve co-axial with and slidable on said inner sleeve beneath said flange and into contact with said flange for controlling the upward and downward movement of said outer sleeve, centering arms, one for each said slot, each pivotally supported below said support to swing in its respective slot toward and from said center and having an extension drivably engaging said outer sleeve, means associated with the outer sleeve and said arms and operable upon movement of the inner sleeve towards said support to move the outer sleeve with the inner sleeve towards said support and to bias each arm radially outwardly, the outward movement of the arms and the upward movement of the outer sleeve being arrested upon engagement of the tire bead by the arms, needle elements, one for each centering arm slidably mounted on and alongside the radially outer edge of said arm to slide through said slots into engagement with the side wall of a tire mounted and centered on said support, each said needle element engaging said flange of said inner sleeve to be moved downwardly thereby, means on each said centering arm to bias said needle element mounted thereon upwardly to said carcass mounted on said support upon the arrest of upward movement of the outer sleeve and upon continued upward movement of the inner sleeve thereby to pierce the tire side wall, and means to depress said inner sleeve and said flange subsequent to the piercing operation.

2. The machine of claim 1 in which said means to bias said centering levers and said needles comprises spring elements mounted on said support and on said centering levers respectively.

3. The machine of claim 1 in which said means to depress said inner sleeve and said flange comprises a rotatable cam and a lever engaging said inner sleeve and said cam.

4. A machine for piercing the side wall of a pneumatic tire which comprises a support for a penumatic tire having a tire bead, a guide pillar normal to said support, said support having slots radial to said pillar, an inner sleeve slidable on said pillar beneath said support towards and away from said support and said sleeve having an outwardly extending flange, said sleeve having a recess, an outer sleeve slidable on said inner sleeve beneath said flange and into contact with said flange for controlling the upward and downward movement of the outer sleeve and having an annular groove, centering arms, one for each said slot, extending upwardly through its respective slot and pivotally supported below said support to swing in its respective slot toward and from said pillar and having an extension engaging said annular groove of said outer sleeve, at least one spring associated with the outer sleeve and the arms and operable upon movement of the inner sleeve towards the support to move the outer sleeve with the inner sleeve towards the support and to bias each arm radially outwardly, the radially outward movement of the arms and the upward movement of the outer sleeve being arrested upon engagement of the tire bead by the arms, needle elements one for each said centering arm slidably mounted along the radially outer edge of its arm to slide longitudinally of the arm and through one of said slots into engagement with the side wall of a tire positioned on said support, each said needle element engaging said flange of said inner sleeve to be moved downwardly thereby, a spring on each said centering arm to bias the needle element mounted thereon upwardly upon the arrest of upward movement of the outer sleeve and upon continued upward movement of the inner sleeve thereby to pierce the tire side wall, an actuating arm engaging the recess of said inner sleeve and a cam engaging said actuating arm and rotatable to tilt said actuating arm to depress said inner sleeve and flange subsequent to the piercing operation.

5. The machine of claim 4 in which said support is a flat table.

6. The machine of claim 5 in which said recess of said inner sleeve is circumferential and in which said inner sleeve projects below said outer sleeve.

7. The machine of claim 5 in which said pillar projects above the said table and in which said machine comprises a guide plate mounted on the upwardly projecting end of the table and spaced from the table to cover the upper ends of the centering levers when said levers are tilted to the radially inner ends of said slots.

8. The machine of claim 4 comprising a needle in the upper end of each of said needle elements, a guard slidably mounted in the upper part of each said needle element enclosing its respective needle and a spring biasing said guard to the pointed end of said needle.

9. The machine of claim 4 comprising a stop to limit the upper movement of said flange of said inner sleeve.

10. The apparatus of claim 4 in which each said centering lever has a guide extending about its respective needle element, each said needle element has an abutment ring spaced from said guide and said spring of each needle element is tensioned between said guide and said abutment.

11. The apparatus of claim 4 comprising an electric motor to rotate said cam, a manually operable switch to start said motor and a limit switch driven by said motor to stop said motor upon the completion of each rotation of said cam.

References Cited in the file of this patent

UNITED STATES PATENTS

| | | |
|---|---|---|
| 485,547 | Kastenhuber et al. | Nov. 1, 1892 |
| 1,578,760 | Replogle | Mar. 30, 1926 |
| 2,483,511 | Vickers | Oct. 4, 1949 |
| 2,561,012 | Clark | July 17, 1951 |
| 2,770,282 | Huzegh | Nov. 13, 1956 |
| 2,841,818 | Griffith | July 8, 1958 |